(12) United States Patent
Nakase et al.

(10) Patent No.: US 11,789,393 B2
(45) Date of Patent: Oct. 17, 2023

(54) IMAGE FORMING APPARATUS

(71) Applicant: CANON KABUSHIKI KAISHA, Tokyo (JP)

(72) Inventors: Takahiro Nakase, Ibaraki (JP); Hideo Nagura, Saitama (JP); Shintaro Kawai, Ibaraki (JP); Ryo Suzuki, Chiba (JP); Nobuaki Suzuki, Chiba (JP); Yoshinori Hara, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/882,981

(22) Filed: Aug. 8, 2022

(65) Prior Publication Data
US 2023/0048843 A1 Feb. 16, 2023

(30) Foreign Application Priority Data
Aug. 13, 2021 (JP) ................................ 2021-132064

(51) Int. Cl.
| G03G 15/00 | (2006.01) |
| G03G 15/02 | (2006.01) |
| G03G 15/04 | (2006.01) |
| G03G 21/18 | (2006.01) |
| H04N 1/60 | (2006.01) |
| H04N 1/00 | (2006.01) |

(52) U.S. Cl.
CPC ..... *G03G 15/5058* (2013.01); *G03G 15/0216* (2013.01); *G03G 15/04072* (2013.01); *G03G 21/1878* (2013.01); *H04N 1/00045* (2013.01); *H04N 1/6033* (2013.01); *G03G 2215/00042* (2013.01); *H04N 2201/0094* (2013.01)

(58) Field of Classification Search
CPC .......... G03G 15/5058; G03G 15/0216; G03G 15/04072; G03G 21/1878; G03G 2215/00042; H04N 1/00045; H04N 1/6033
See application file for complete search history.

(56) References Cited

U.S. PATENT DOCUMENTS

2014/0270828 A1* 9/2014 Suzuki ............... G03G 15/5058
399/55
2016/0124367 A1* 5/2016 Kaneko ............. G03G 15/5058
399/53

FOREIGN PATENT DOCUMENTS

| JP | 2014-215333 A | 11/2014 |
| JP | 2016-092751 A | 5/2016 |

* cited by examiner

*Primary Examiner* — Sandra Brase
(74) *Attorney, Agent, or Firm* — Venable LLP

(57) ABSTRACT

An image forming apparatus comprises: an image processor to convert image data based on a conversion condition; an image forming unit to form an image based on the converted image data using a replaceable member; a memory to store the image data and the converted image data; a sensor to perform measurement of a test image; and a controller. If the replacement of the replaceable member is detected while forming images, the controller controls the image forming unit to form the test image and generates the conversion condition based on a result of the measurement of the test image. If the replacement of the replaceable member is detected while forming the images, the controller further controls the image processor to convert the image data stored in the memory based on the generated conversion condition.

8 Claims, 9 Drawing Sheets

IMAGE FORMING APPARATUS

BACKGROUND OF THE INVENTION

Field of the Invention

The present disclosure relates to an image forming apparatus.

Description of the Related Art

Conventionally, it is common that an image forming apparatus adopting, for example, an electrophotographic scheme performs, on input image data, tone correction for suppressing variation in color appearance and density and halftone processing for converting multivalued signals into binary signals prior to image formation. In the tone correction, an input signal is converted into a corrected signal using a correction table selected depending on output characteristics of the apparatus, for example. In the halftone processing, the size of image data is compressed by binarization of signals using error diffusion or halftone screening, for example.

Japanese Patent Laid-Open No. 2016-92751 discloses a technology that measures output characteristics of an apparatus at timings such as power-on, a replacement of a member such as a toner cartridge, and a temperature or humidity change, and calibrates correction tables based on the measurement result. Japanese Patent Laid-Open No. 2014-215333 discloses a technology that converts a color model of 8-bit input image data from RGB to CMYK, and then performs tone correction and halftone processing to form an image using image data having a single bit for each of C, M, Y and K.

SUMMARY OF THE INVENTION

However, the existing technologies would still sometimes cause variation in color appearance and density in images formed by an image forming apparatus due to content of input image data or a timing of a member replacement. Though the variation in color appearance and density could be resolved by performing calibration every time an image is formed, processing time until completion of a job in this case becomes longer, which lowers productivity.

In light of the foregoing, the present disclosure aims at providing a mechanism that can achieve both of suppression of variation in color appearance and density of images formed by an image forming apparatus, and enhancement of productivity According to an aspect, there is provided an image forming apparatus comprising: an image processor configured to convert image data based on a conversion condition; an image forming unit configured to form an image based on the converted image data as the image data converted by the image processor, the image forming unit having a replaceable member; a memory configured to store the image data and the converted image data; a sensor configured to perform measurement on a test image formed by the image forming unit; and a controller configured to: detect a replacement of the replaceable member; in a case where the replacement of the replaceable member is detected while the image forming apparatus is forming images based on a job, control the image forming unit to form the test image; generate the conversion condition based on a result of the measurement on the test image performed by the sensor; and, in a case where the replacement of the replaceable member is detected while the image forming apparatus is forming the images based on the job, control the image processor to convert the image data stored in the memory based on the generated conversion condition.

Further features of the present invention will become apparent from the following description of exemplary embodiments (with reference to the attached drawings).

DESCRIPTION OF THE EMBODIMENTS

Figure 1:
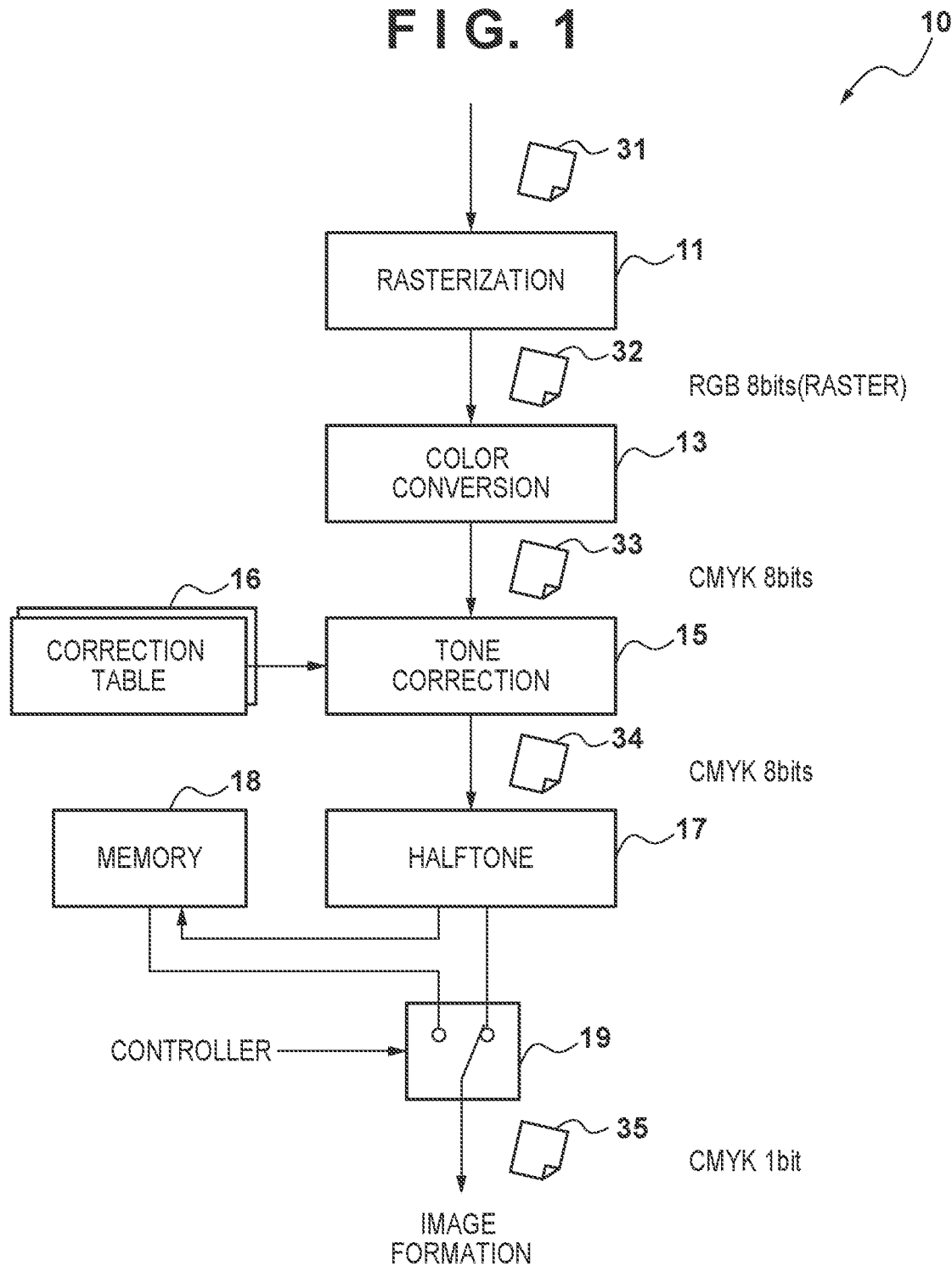
FIG. 1 is a block diagram illustrating an example of a configuration of image processing according to a first comparative example.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. INTRODUCTION

In this section, an example where a technology according to the present disclosure is applied to a digital multifunction peripheral is mainly described. However, the technology according to the present disclosure is not limited to such an example, and is widely applicable to various types of image forming apparatuses such as printers, copiers and facsimile machines. Unless otherwise explained, each of constituent elements described below such as apparatuses, devices, modules, and chips may be composed of a single entity or a plurality of physically different entities.

First, descriptions will be given using FIGS. 1 to 4 regarding configurations of image processing according to comparative examples as well as issues related to those configurations. FIG. 1 illustrates, as the first comparative example, an exemplary configuration of image processing 10 applied to input image data prior to image formation that can be employed in an image forming apparatus adopting an electrophotographic scheme. With reference to FIG. 1, the image processing 10 according to the first comparative example includes rasterization 11, color conversion 13, tone correction 15, halftone processing 17, and switching processing 19.

Input image data 31 received as a target of job execution is input to the rasterization 11. The input image data 31 is image data described with a high-level page description language (PDL), for example. The rasterization 11 converts the input image data 31 into raster image data 32. The raster image data 32 represents an image in a bitmap format. The raster image data 32 has a bit depth of 8 bits per color component for each pixel, for example. Processing time of the rasterization 11 varies depending on content of an image represented by the input image data 31.

The color conversion 13 converts a color model of the raster image data 32 (for example, RGB) to a color model suitable for image formation (for example, CMYK) to generate uncorrected image data 33. The tone correction 15 corrects the tone of each color component of each pixel of the uncorrected image data 33 using a correction table 16 to generate corrected image data 34. The correction table 16 may be a lookup table that defines a signal conversion curve (for example, a gamma curve or any other curve) to be used for the tone correction, for example. The halftone processing 17 converts multivalued signal values of each color component of each pixel of the corrected image data 34 into binary signal values by area coverage modulation to generate compressed image data 35. The compressed image data 35 is output to an image forming unit for use in image formation.

Herein, in a case where an executed job spans multiple copies, the same image based on the input image data 31 will be formed multiple times. Hence, storing the compressed image data 35 generated by the halftone processing 17 in the memory 18 and reusing the compressed image data 35 retrieved from the memory 18 for image formation can help shortening the processing time of image formation for the second and subsequent copies. The switching processing 19 represents such reuse of the image data. For example, under control of a controller, the compressed image data 35 resulting from the halftone processing 17 is output to the image forming unit for forming an image of the first copy based on certain input image data 31 of a certain job. When forming an image of the second and subsequent copies based on the same input image data 31, the compressed image data 35 temporarily stored in the memory 18 is retrieved, and the retrieved compressed image data 35 is output to the image forming unit.

In general, the data size of image data after the halftone processing 17 is reduced compared to the data size of image data before the halftone processing 17. Hence, by configuring the compressed image data 35 to be reused as described above, it is possible to shorten execution time of a job that spans multiple copies to enhance productivity while saving usage of memory resources.

Figure 2A:
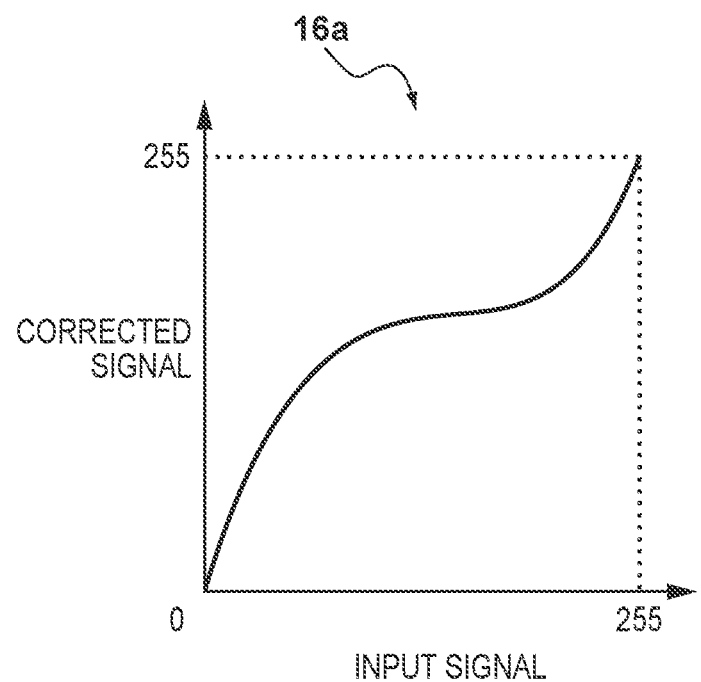
FIG. 2A is an explanatory diagram for explaining a first example of a signal conversion curve used for tone correction.
Figure 2B:
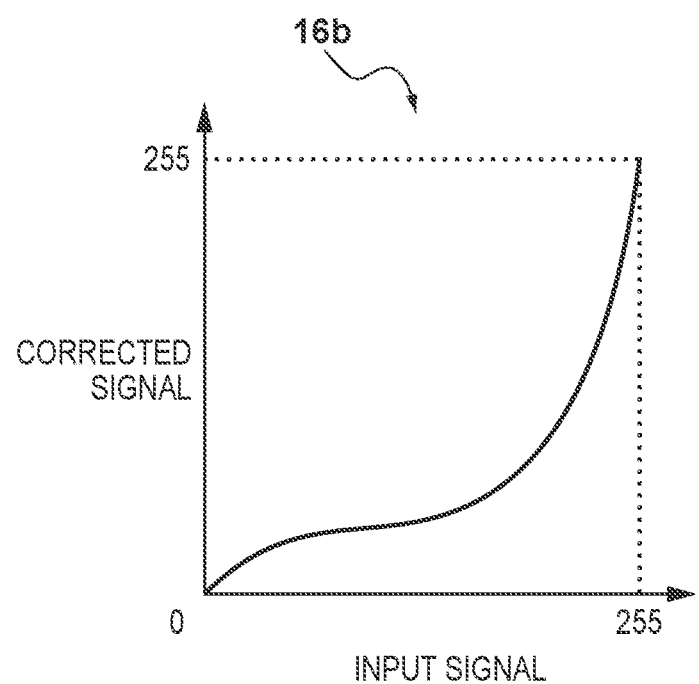
FIG. 2B is an explanatory diagram for explaining a second example of a signal conversion curve used for tone correction.

FIGS. 2A and 2B are explanatory diagrams for explaining some examples of signal conversion curves that may be represented by the correction table 16 used for tone correction 15. FIG. 2A shows a signal conversion curve 16a, and FIG. 2B shows a signal conversion curve 16b. Each of the signal conversion curves 16a, 16b is a curve for converting a signal value of an input signal which can take a value within a range from 0 to 255 into a signal value of a corrected signal which can similarly take a value within a range from 0 to 255. The signal conversion curve 16a is defined as a conversion curve with which a signal value belonging to a midsection of the range of the input signal is converted into a larger signal value of the corrected signal compared to the signal conversion curve 16b.

In general, it is known for image forming apparatuses that, as degradation of a member of an image forming unit progresses, decrease in printing density appears when image data with the same signal values is used for printing without any change. It is thus beneficial to selectively switch between the signal conversion curve 16a and the signal conversion curve 16b for use in tone correction 15, for example, depending on the degree of decrease in the printing density through calibration at the time of starting a job. For example, performing the tone correction using the signal conversion curve 16b when the members have not so degraded, and the signal conversion curve 16a when the members have degraded to some degree can suppress variation in color appearance and density due to degradation of a member. Of course, an optimal curve may be selected from more than two signal conversion curves for tone correction. Such a signal conversion curve may be stored in a form of a look-up table with discretely-sampled points on the curve.

However, in a case where a member of the image forming unit is replaced during execution of a job over multiple copies reusing the compressed image data 35 as in the example of FIG. 1, there is a risk that an unwanted outcome occurs. An example of such an outcome is described using FIG. 3.

Figure 3:
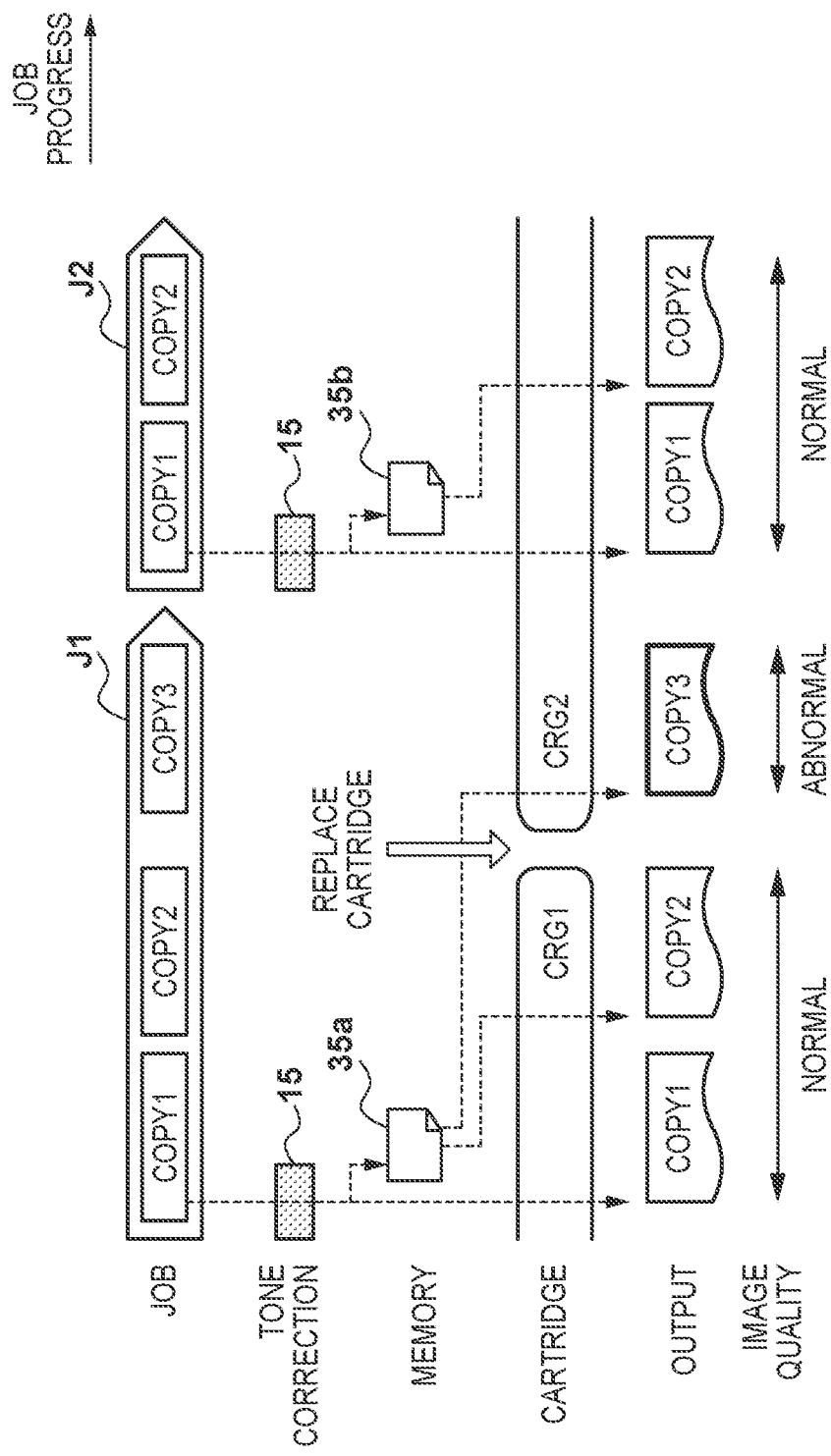
FIG. 3 is an explanatory diagram for explaining unwanted image quality deterioration due to a replacement of a member.

FIG. 3 is an explanatory diagram for explaining unwanted image quality deterioration due to a replacement of a member. In the example of FIG. 3, it is assumed that the print jobs J1 and J2 are executed in order along temporal progress from left to right. The print job J1 is a job for outputting three copies of printed material based on input image data. The print job J2 is a job for outputting two copies of printed material based on other input image data.

At the beginning of the print job J1, a toner cartridge CRG1 has already been mounted in the apparatus. As the toner cartridge CRG1 is approaching a late stage of its lifetime, tone correction tables each representing the signal conversion curve 16a are used for the tone correction 15. When outputting the first copy of printed material of the print job J1, the compressed image data 35a is generated through the tone correction 15 and the halftone processing 17. The first copy of the printed image(s) of the print job J1 is formed based on this compressed image data 35a. The compressed image data 35a is stored in the memory 18, too. The second copy of the printed image(s) of the print job J1 is formed based on the compressed image data 35a read out from the memory 18. Then, consider that the lifetime of the toner cartridge CRG1 ends before printing of the third copy of the print job J1 has started. The job execution is suspended in response to the end of the lifetime. A user who found a notification of the suspended job replaces the toner cartridge CRG1 with a new toner cartridge CRG2, and restarts the job execution. The third copy of the printed image(s) of the print job J1 is then formed based on the compressed image data 35a read out from the memory 18. Despite the fact that the image formation of this third copy is performed using the new toner cartridge CRG2, the tone correction 15 with the signal conversion curve 16a that is suitable and selected for the old toner cartridge CRG1 has been applied to the reused compressed image data 35a. Consequently, the density of the third copy of the printed image(s) of the print job J1 will be unduly higher than a normally expected density. That is, the image quality of the third copy of the printed image degrades compared to the first and second copies.

At the beginning of the print job J2, the toner cartridge CRG2 has already been mounted in the apparatus and, as a result of calibration, tone correction tables each representing the signal conversion curve 16b are used for the tone correction 15. When outputting the first copy of printed material of the print job J2, the compressed image data 35b is generated through the tone correction 15 and the halftone processing 17. The first copy of the printed image(s) of the print job J2 is formed based on this compressed image data 35b using the toner cartridge CRG2. The compressed image data 35b is stored in the memory 18, too. The second copy of the printed image(s) of the print job J2 is formed based on the compressed image data 35b read out from the memory 18 using the toner cartridge CRG2. Consequently, the density of the printed image(s) recovers to be a normal level.

Figure 4:
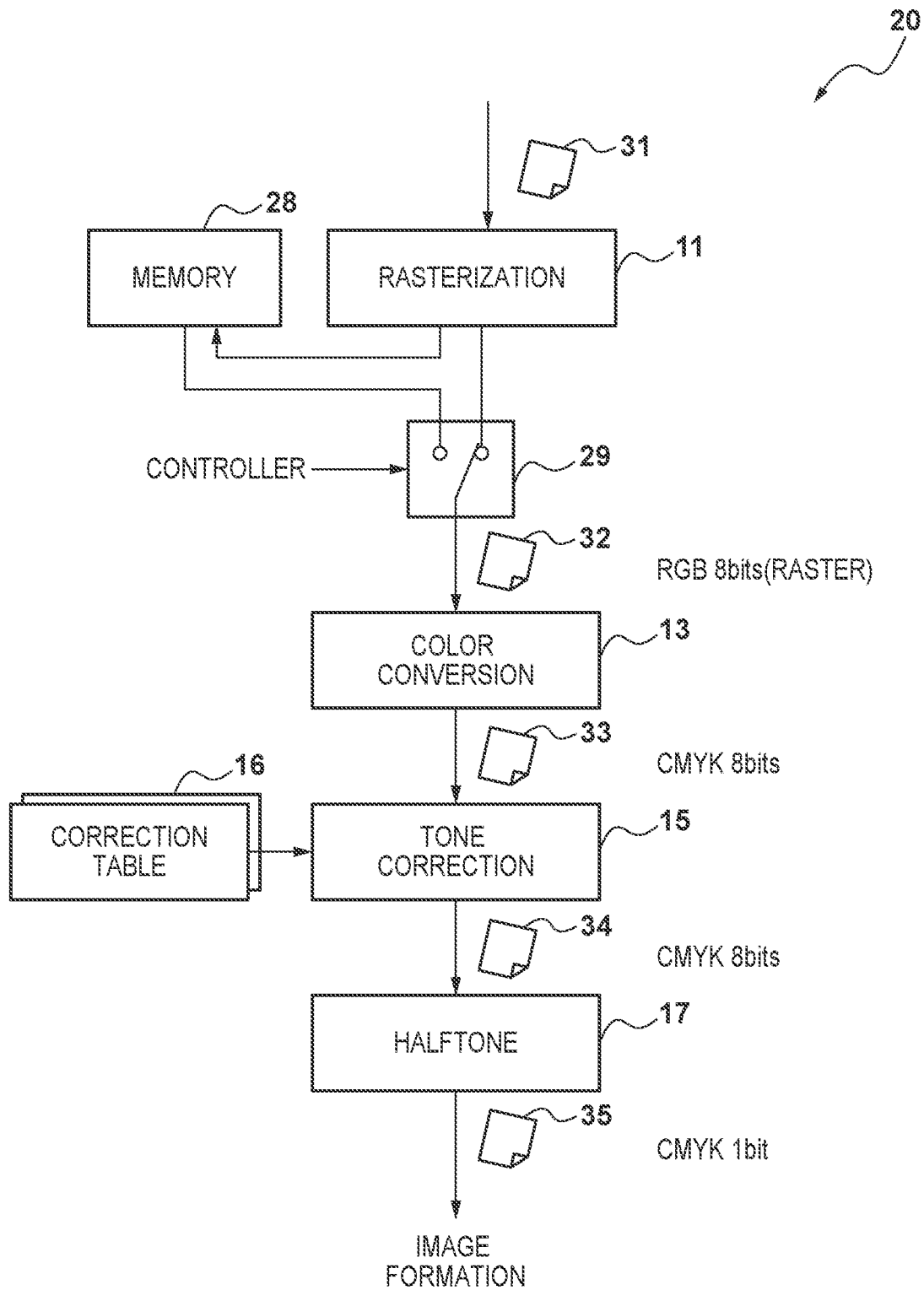
FIG. 4 is a block diagram illustrating an example of a configuration of image processing according to a second comparative example.

Adopting image processing 20 according to the second comparative example as illustrated in FIG. 4 in order to prevent the above-described degradation of image quality can be considered. With reference to FIG. 4, the image processing 20 according to the second comparative example includes the rasterization 11, switching processing 29, the color conversion 13, the tone correction 15, and the halftone processing 17. Unlike the case of the image processing 10 where the compressed image data 35 after the halftone processing 17 is stored in the memory 18 and reused, the raster image data 32 after the rasterization 11 is stored in the memory 28 and reused in the case of the image processing 20. Under control of a controller, the switching processing 29 reads out the raster image data 32 from the memory 28 and inputs it to the color conversion 13 for image formation of the second and subsequent copies. Therefore, in this case, the color conversion 13, the tone correction 15, and the halftone processing 17 are repeated for the image formation of the second and subsequent copies.

According to the second comparative example, even when a member involved in image formation such as a toner cartridge is replaced, appropriately-calibrated correction tables 16 are used for the subsequent tone correction 15, and thus the image quality degradation described using FIG. 3 will be prevented. In addition, the raster image data 32 being reused means that the rasterization 11, which would sometimes take a long time depending on content of the data, is not repeated, and thus only a slight processing delay will be caused. However, the data size of the raster image data 32 is significantly large compared to the compressed image data 35. Hence, the image processing 20 according to the second comparative example consumes huge memory resources, increases load on circuitry, and requires an increased manufacturing cost of the apparatus.

The embodiments described in detail from the next section aim at mitigating at least one of these inconveniences related to the comparative examples, and achieving both of suppression of variation in color appearance and density of printed images and enhancement of productivity.

2. CONFIGURATION EXAMPLE OF IMAGE FORMING APPARATUS

<2-1. Overall Configuration>

Figure 5:
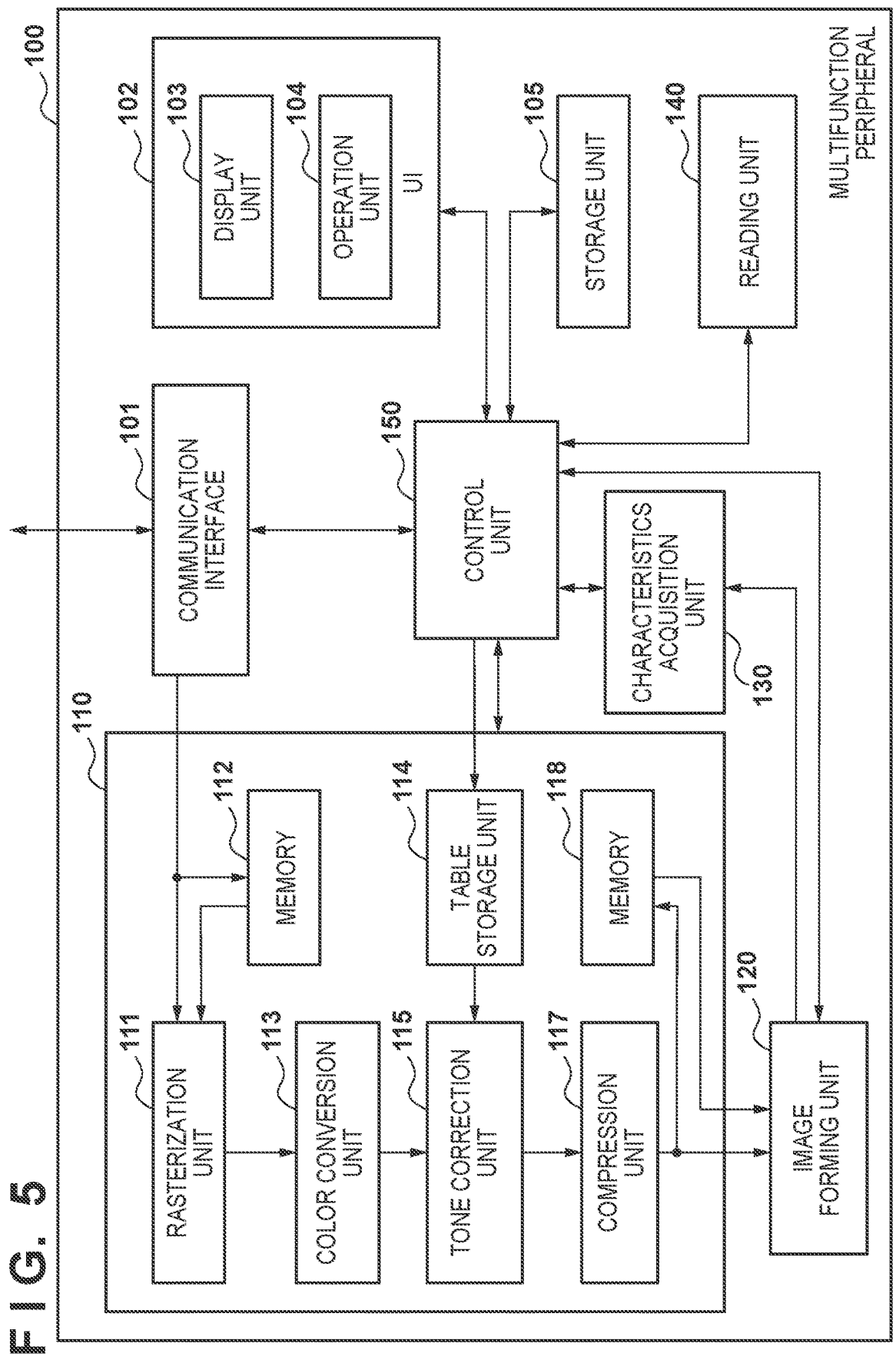
FIG. 5 is a block diagram illustrating an example of a configuration of an image forming apparatus according to an embodiment.
Figure 6:
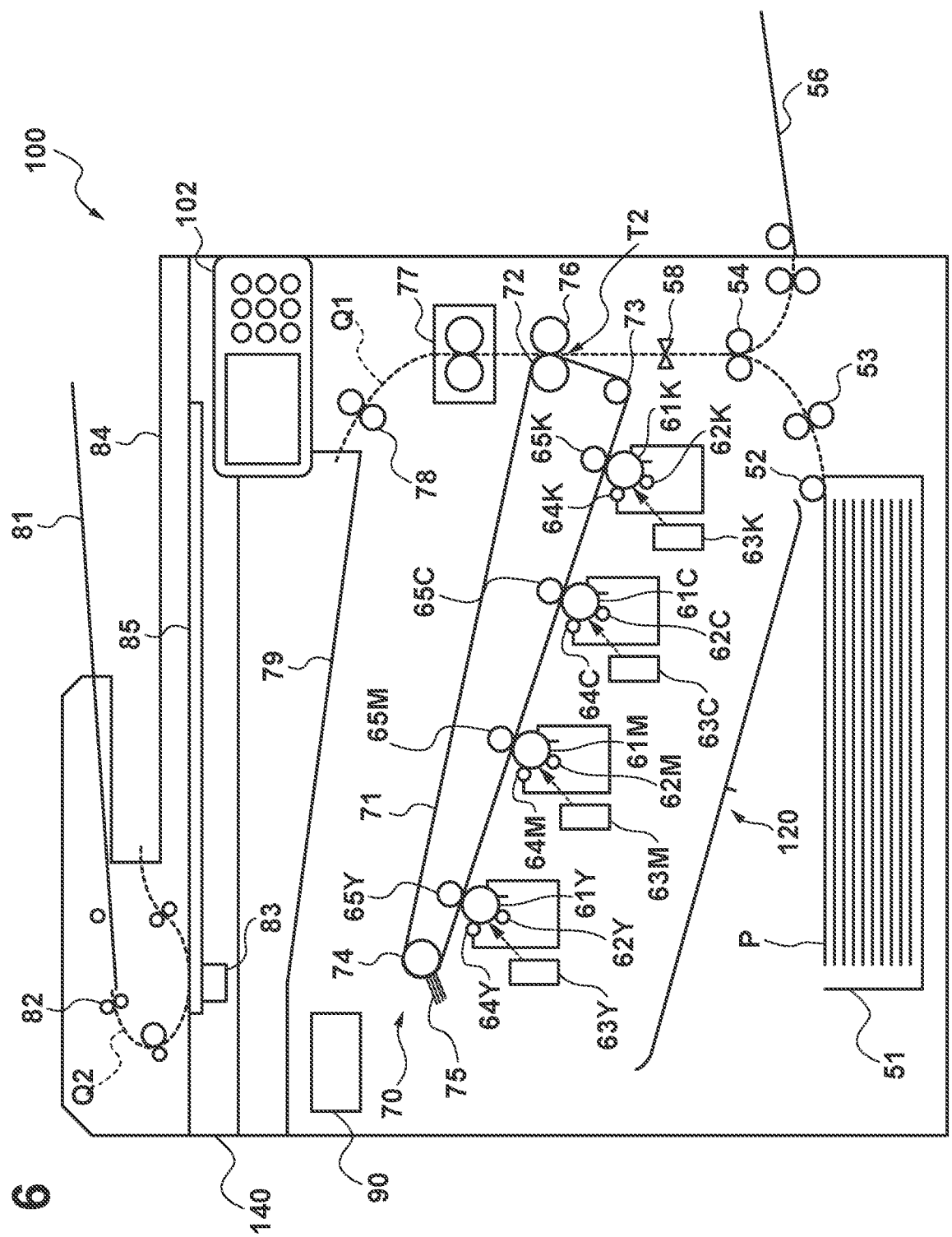
FIG. 6 is a schematic cross-sectional view illustrating in more detail a configuration of an image forming unit of the image forming apparatus illustrated in FIG. 5.

A multifunction peripheral 100 according to the embodiment described in this section is an image forming apparatus that is capable of forming a color image on a sheet through an electrophotographic process. FIG. 5 is a block diagram illustrating an example of a configuration of the multifunction peripheral 100. FIG. 6 is a schematic cross-sectional view illustrating in more detail a configuration of an image forming unit 120 of the multifunction peripheral 100 illustrated in FIG. 5.

With reference to FIG. 5, the multifunction peripheral 100 comprises a communication interface 101, a user interface (UI) 102, a storage unit 105, an image processor 110, an image forming unit 120, a characteristics acquisition unit 130, a reading unit 140, and a control unit 150. The user interface 102 includes a display unit 103 and an operation unit 104.

The communication interface 101 is an interface for the multifunction peripheral 100 to communicate with other apparatuses. The communication interface 101 may be a wired communication interface or a wireless communication interface. The display unit 103 is a unit that presents an image and information to a user. The operation unit 104 is a unit that receives an instruction and an information input from a user. The operation unit 104 may include one or more of a touch sensor, a button, a switch, and a key pad. The storage unit 105 stores one or more computer programs to be executed by the control unit 150, and various data such as configuration data and image data. The storage unit 105 may include volatile memories such as random access memories (RAMs) and non-volatile memories such as read-only memories (ROMs) and a hard disk drive (HDD), for example.

The image processor 110 is a processing circuit that performs signal processing (for example, image conversion based on at least one conversion condition) on image data input to the image forming unit 120. The processing performed by the image processor 110 will be described in detail below. The image forming unit 120 forms, on a sheet, an image based on image data input from the image processor 110. In the present embodiment, the image forming unit 120 includes one or more replaceable members. The replaceable members may include a toner cartridge, for example. The characteristics acquisition unit 130 includes a sensor to perform measurement on a test image for calibration formed by the image forming unit 120, and acquires image output characteristics related to the replaceable members of the image forming unit 120 based on a result of the measurement to notify the control unit 150 of the acquired image output characteristics. The reading unit 140 optically reads a document to generate read image data.

The control unit 150 is a controller that controls overall functions of the multifunction peripheral 100. The control unit 150 may include one or more processors such as central processing units (CPUs), for example. When a print job is received via the communication interface 101, for example, the control unit 150 causes the image processor 110 to process the input image data, and causes the image forming unit 120 to perform image formation based on the processed image data. When an instruction to execute a scan job is received, the control unit 150 causes the reading unit 140 to perform document reading. When an instruction to execute a copy job is received, the control unit 150 causes the reading unit 140 to perform document reading, causes the image processor 110 to process the read image data, and causes the image forming unit 120 to perform image formation based on the processed image data.

With reference to FIG. 6, the multifunction peripheral 100 comprises a cassette 51 disposed in such a way that it can be drawn from the housing. A bundle of sheets P is loaded in the cassette 51. Any kind of recording material such as plain paper, thick paper, OHP sheets, coated paper, label paper, perforation paper, for example, may be used as the sheets P.

The multifunction peripheral 100 further comprises a conveyance mechanism which includes several rollers for conveying a sheet P. For example, the feeding roller 52 picks up a sheet P from the cassette 51 to feed the sheet P toward the conveyance path Q1 (indicated by a dashed line in the figure). The separation roller pair 53 separates the sheet P picked up by the feeding roller 52 from the bundle of sheets one by one. The registration roller pair 54 regulates the leading edge of the incoming sheet P conveyed along the conveyance path Q1 by the separation roller pair 53 to rectify skewing of the sheet P. It should be noted that paper feeding from the manual feed tray 56 instead of the cassette 51 may also be possible in the multifunction peripheral 100 though its detailed explanation is omitted. The jam sensor 58 is a sensor for detecting jamming of the sheet P on the conveyance path Q1.

In the present embodiment, the image forming unit 120 is capable of forming a color image on the sheet P using developing agent (also referred to as toner) of four color components including yellow (Y), magenta (M), cyan (C), and black (K). In the figure, an alphabet representing each color component is appended as a suffix of a reference sign in order to identify a member related to the color component. For the members in which there is no difference among the color components, explanations are made only once without the suffixes to avoid making the explanations redundant. The image forming unit 120 has, for each color component, a photosensitive drum 61, a charging roller 62, a laser unit (light source) 63, a developing roller 64, and a primary transfer roller 65. The image forming unit 120 may further include, for each color component, a drum cleaning member (not shown). The photosensitive drum 61 is a rotatably-disposed photosensitive member. The charging roller 62 uniformly charges the surface of the photosensitive drum 61. The laser unit 63 forms an electrostatic latent image on the surface of the photosensitive drum 61 by exposing the surface of the photosensitive drum 61 to a laser light in accordance with image data for printing. The developing roller 64 supplies toner of each color component from a toner chamber to the electrostatic latent image on the surface of the photosensitive drum 61 to form a toner image on the surface of the photosensitive drum 61 (that is, develops a developing agent image to make it visible).

The image forming unit 120 further has a transfer unit 70 including an intermediate transfer belt 71, a driving roller 72, a driven roller 73, a tension roller 74 and a belt cleaner 75. The intermediate transfer belt 71 is supported by the driving roller 72, the driven roller 73, and the tension roller 74, and is driven by the driving roller 72 to rotate. Four primary transfer rollers 65Y, 65M, 65C, and 65K are disposed inside the intermediate transfer belt 71 at positions respectively facing the photosensitive drums 61Y, 61M, 61C, and 61K. These primary transfer rollers 65 form a multicolor toner image on the intermediate transfer belt 71 by transferring the toner images formed on the respective photosensitive drums 61 to the intermediate transfer belt 71 in turn in a layered manner.

A secondary transfer roller 76 is disposed at a position facing the driving roller 72 with the intermediate transfer belt 71 in between. The portion between the driving roller 72 and the secondary transfer roller 76 is referred to as a secondary transfer nip T2. At the secondary transfer nip T2, the toner image on the intermediate transfer belt 71 is transferred onto an incoming sheet P conveyed along the conveyance path Q1.

The belt cleaner 75 is disposed at a position facing the tension roller 74, and may be constituted with an elastic body having a shape of a brush, for example. A power supply unit (not shown) applies a cleaning voltage to the belt cleaner 75 with a polarity opposite to remaining toner, and the belt cleaner 75 removes the remaining toner on the intermediate transfer belt 71 from the intermediate transfer belt 71. Toner remaining on the surface of the photosensitive drum 61 may be gathered by the above-mentioned drum cleaning member.

The sheet P that has passed through the secondary transfer nip T2 is conveyed by the secondary transfer roller 76 to the fixing unit 77. The fixing unit 77 has a roller pair that presses the sheet P and a heater that heats the sheet P. The fixing unit 77 presses and heats the sheet P so as to melt the toner image formed on the sheet P and fix it on the sheet P. A voltage for preventing the toner from adhering may be applied to the surfaces of the roller pair of the fixing unit 77. The sheet P that has passed through the fixing unit 77 is further conveyed by the discharge roller pair 78 and discharged to the discharge tray 79.

Furthermore, a physical configuration of the reading unit 140 is also schematically illustrated in FIG. 6. The reading unit 140 includes, for example, a document tray 81 on which a document is placed, conveyance rollers 82 which convey the document along a conveyance path Q2, an image sensor 83 which optically reads the document, a discharge tray 84 to which the read document is discharged, and a platen 85. The image sensor 83 can read, depending on a reading mode, a document being conveyed along the conveyance path Q2 while the sensor stays still, or a document placed on the platen 85 while the sensor is moving.

A circuit board 90 disposed inside the housing of the multifunction peripheral 100 is also illustrated in FIG. 6 in a simplified manner. There may be numerous circuit elements, for example, constituting various functions described using FIG. 5 (for example, CPU, ROM and RAM) disposed on the circuit board 90

In the present embodiment, the image forming unit 120 includes one or more replaceable members. The replaceable members may include, for example, a toner cartridge that is removable from the housing of the multifunction peripheral 100. The toner cartridge may include, for example, at least one of the photosensitive drum 61 as a photosensitive member, the charging roller 62 as a charging device, a laser unit 63 as a light source, a developing roller 64 as a developing device, and a transfer unit 70 as a transfer device. Upon determining that a lifetime of a replaceable member has ended, the control unit 150 causes the image forming unit 120 to stop operating, and causes the display unit 103 to display a message prompting a user to replace the member. A user who found such a message, for example, opens an openable cover of the housing of the multifunction peripheral 100, detaches the old replaceable member from the housing, attaches a new replaceable member to the housing, and closes the cover. An end of a lifetime of a replaceable member may be determined based on the accumulated number of operations or operation time of the member, or a remaining amount of a consumable agent contained in the member.

Note that the present embodiment is not limited to the example where a toner cartridge is replaceable. For example, any one of the photosensitive member, the charging roller, the light source, developing roller, the transfer device, and the fixing device, or a combination thereof may be replaceable.

<2-2. Details of Image Processing>

Referring back to FIG. 5, the signal processing performed by the image processor 110 on image data prior to be input to the image forming unit 120 in the present embodiment is described in detail. The image processor 110 includes a rasterization unit 111, a memory 112, a color conversion unit 113, a table storage unit 114, a tone correction unit 115, a compression unit 117, and a memory 118.

The rasterization unit 111 may correspond to a so-called raster image processor (RIP). The rasterization unit 111 converts the input image data that the multifunction peripheral 100 has received as a target of job execution into raster image data, and output the raster image data after the conversion to the color conversion unit 113. The input image data may be, for example, received via the communication interface 101 from an external apparatus. As an example, if the input image data is PDL data, the rasterization unit 111 may analyze the high-level PDL data to generate raster image data representing an image in a bitmap format. The PDL data may be, for example, data defining image content for each page with a set of printer control codes for drawing objects such as characters, graphics and images (photographs). Some objects in the PDL data may be described as vector data, and the other objects may be described as raster data. The rasterization unit 111 may generate the raster image data by analyzing such PDL data and expanding the image content to a bitmap.

The memory 112 is a storage unit that is capable of storing the input image data input to the rasterization unit 111. In the present embodiment, the memory 112 may temporarily store, when image formation over multiple copies is performed in a single job, input image data of the first copy of each page in preparation to reuse it in printing the second and subsequent copies.

The color conversion unit 113 converts a color model of the raster image data input from the rasterization unit 111 to a color model suitable for image formation (for example, CMYK), and output the raster image data after color conversion to the tone correction unit 115. The color model before the color conversion may be any color model such as grayscale, RGB or the like. The color conversion unit 113 may perform color adjustment based on International Color Consortium (ICC) profile when converting the color model. The ICC profile may be configured with a source profile and a printer profile. The source profile is a profile for converting input image data tentatively to L*a*b* data. The source profile may include an RGB profile and a CMYK profile and, in this case, the RGB profile is selected when the color model at the input side is RGB, and the CMYK profile is selected when the color model at the input side is CMYK. The printer profile is a profile for converting the L*a*b* data to CMYK data that is suitable for color characteristics of the image forming unit 120. These profiles are usually provided in a form of look-up tables, and the color conversion unit 113 may refer to the look-up tables to convert a color vector of each pixel of input raster image data to a color vector of the color model after color conversion The tone correction unit 115 corrects, by referring to tone correction tables stored in the table storage unit 114, tones of the raster image data input from the color conversion unit 113 to generate corrected image data. The table storage unit 114 stores tone correction tables that depend on the output characteristics of the image forming unit 120 acquired by the characteristics acquisition unit 130. The tone correction tables may be a kind of conversion conditions for the image conversion performed by the image processor 110. The tone correction tables may be provided as respective look-up tables for four color components of C, M, Y and K, for example. The tone correction may be performed in order to maintain linearity of printed images that could vary per image forming operation. A result of calibration described below may be reflected in these look-up tables. As an example, a plurality of tone correction tables (conversion conditions) each of which represents a conversion curve defining a relationship between an input signal and a corrected signal such as the signal conversion curves 16a and 16b described using FIGS. 2A and 2B may be stored in advance in the table storage unit 114 for each color component. In this case, the tone correction unit 115 converts an input signal value of each color component of each pixel of the raster image data into a corrected signal value in accordance with an optimal tone correction table selected based on the output characteristics of the image forming unit 120. As another example, a tone correction table (a conversion condition) may be dynamically generated for each color component based on the output characteristics of the image forming unit 120 and stored in the table storage unit 114. In this case, the tone correction unit 115 converts an input signal value of each color component of each pixel of the raster image data into a corrected signal value in accordance with the latest tone correction table stored in the table storage unit 114. The tone correction unit 115 outputs the corrected image data generated in this way to the compression unit 117.

The compression unit 117 compresses the corrected image data input from the tone correction unit 115 to generate compressed image data. In the present embodiment, compression of the corrected image data by the compression unit 117 includes halftone processing. That is, the compression unit 117 may compress the corrected image data by converting a multivalued (for example, 8-bit) signal value of each color component of each pixel of the corrected image data into a binary (that is, 1-bit) signal value by area coverage modulation. The compression unit 117 may, for example, selectively apply one of different types of screening methods to the corrected image data. For example, the compression unit 117 may use an error diffusion method that is less likely to cause moire when a copy job is performed whereas it may use a halftone screening utilizing a dither matrix to enhance reproducibility of characters and thin lines when a print job is performed. The error diffusion method is a technique that assigns weights to a pixel of interest and neighboring pixels by means of an error filter, thereby distributing a binarization error of a signal value of the pixel of interest to the neighboring pixels while keeping tonality. The halftone screen is a technique to represent intermediate tones approximately using a dither matrix. The compression unit 117 may switch selectively between a low screen ruling and a high screen ruling to use depending on content of the corrected image data. The compression unit 117 outputs the compressed image data generated in this way to the image forming unit 120.

Note that the compression unit 117 may perform any lossy compression processing (for example, simple bit depth reduction) instead of or in addition to the halftone processing.

The memory 118 is a storage unit that is capable of storing the compressed image data output from the compression unit 117. In the present embodiment, the memory 118 may temporarily store, when image formation over multiple copies is performed in a single job, compressed image data of the first copy of each page in preparation to reuse it in printing the second and subsequent copies. The memory 112 and the memory 118 may be separate storage devices that are different from each other, or may be respective storage regions that are allocated statically or dynamically in a single storage device. The memory 112 and the memory 118 may be portions of the storage unit 105.

Though not illustrated in FIG. 5, the image processor 110 may perform further image processing before outputting the image data to the image forming unit 120. For example, the image processor 110 may perform, on image data of each color component, edge detection based on pattern matching and smooth the detected edges by converting them into smoother patterns to mitigate jaggies.

<2-3. Calibration of Tone Correction Tables>

The control unit 150 performs calibration of the tone correction tables when a calibration trigger is detected such as power-on of the multifunction peripheral 100, a replacement of a replaceable member of the image forming unit 120, or a change in an environmental condition (for example, an environmental temperature or an environmental humidity) exceeding a threshold. In order to detect such a calibration trigger, the multifunction peripheral 100 may be equipped with one or more of a replacement detection sensor, a temperature sensor and a humidity sensor (not shown).

The control unit 150 causes the characteristics acquisition unit 130 to acquire the image output characteristics of the image forming unit 120 when calibrating the tone correction tables. For example, the characteristics acquisition unit 130 may acquire the image output characteristics of the image forming unit 120 by measuring densities of patch images of a predetermined pattern formed on a sheet by the image forming unit 120. Additionally or alternatively, the characteristics acquisition unit 130 may acquire the image output characteristics of the image forming unit 120 by reading out, from a memory embedded in a member (for example, a cartridge) that has been newly mounted to the image forming unit 120, characteristics data representing characteristics related to that member. Then, the control unit 150 calibrates the tone correction tables stored in the table storage unit 114 depending on the image output characteristics acquired by the characteristics acquisition unit 130.

As an example, from among a plurality of tone correction tables (conversion conditions) stored in advance in the table storage unit 114, the control unit 150 may select, for each color component, a table that is suitable for the image output characteristics of the image forming unit 120 as a table to be used for the tone correction. As another example, the control unit 150 may dynamically generate tone correction tables (conversion conditions) that suit for the image output characteristics of the image forming unit 120 to store the generated tone correction tables in the table storage unit 114.

In an example of an alteration, the control unit 150 may also calibrate the profile (for example, a printer profile) used in the color conversion unit 113 in addition to the calibration of the tone correction tables.

<2-4. Control of Image Processing>

Next, the control of signal processing performed prior to inputting to the image forming unit 120 is described in detail. As described above, the control unit 150 controls the signal processing performed in the image processor 110. More specifically, in the present embodiment, the control unit 150 causes the image data before the tone correction by the tone correction unit 115 (hereinafter, referred to as uncorrected image data) to be stored in the memory 112 when image formation over multiple copies is performed in a single job. In the present embodiment, the uncorrected image data corresponds to the input image data before being processed by the rasterization unit 111 that may correspond to a RIP. In addition, the control unit 150 causes the compressed image data generated for image formation of the first copy by the compression unit 117 to be stored in the memory 118.

During execution of a job requiring printing over multiple copies as described above, the control unit 150 controls the image forming unit 120 to form images by reusing the compressed image data stored in the memory 118 when a replacement of the replaceable members of the image forming unit 120 is not detected. By reusing the compressed image data to form images in this way, redundant repetitions of image processing is avoided, and execution time of jobs can be shortened. When a replacement of a replaceable member is detected, the control unit 150 controls the image forming unit 120 to form images by reusing the uncorrected image data stored in the memory 112 after performing update or re-selection of the tone correction tables in the table storage unit 114. That is, in this case, rasterization, color model conversion, tone correction (using the changed tone correction tables), and halftone processing are performed again on the uncorrected image data read out from the memory 112 for forming printed images for the remaining uncompleted copies. The control unit 150 may discard the compressed image data that has been stored in the memory 118 upon detection of a replacement of a replaceable member of the image forming unit 120.

Figure 7:
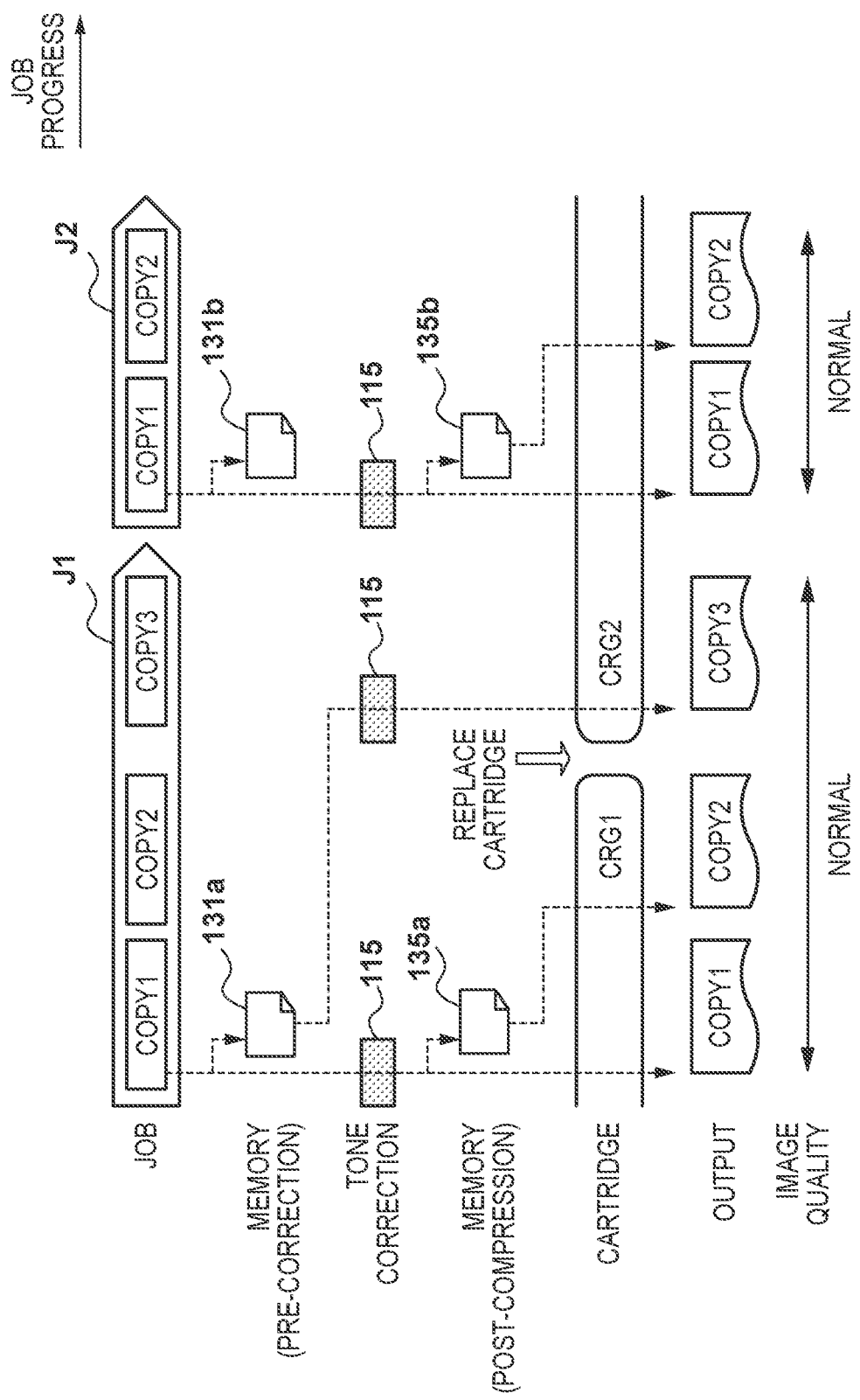
FIG. 7 is an explanatory diagram for explaining an example of switching image data to be reused.

FIG. 7 is an explanatory diagram for explaining an example of switching image data to be reused in the present embodiment. Similarly to the example of FIG. 3, it is assumed that the print jobs J1 and J2 are executed in order along temporal progress from left to right also in the example of FIG. 7. The print job J1 is a job for outputting three copies of printed material based on input image data. The print job J2 is a job for outputting two copies of printed material based on another input image data.

At the beginning of the print job J1, a toner cartridge CRG1 has been mounted in the multifunction peripheral 100. When outputting the first copy of printed material of the print job J1, uncorrected image data 131a is stored in the memory 112. Typically, the uncorrected image data 131a may be input image data before rasterization. In addition, compressed image data 135a generated by the compression unit 117 is stored in the memory 118. The first and second copies of the printed image(s) of the print job J1 is formed based on the compressed image data 135a. Then, before printing the third copy of the print job J1 been started, it is determined that the lifetime of the toner cartridge CRG1 has ended, and the execution of the print job J1 is suspended. A user replaces the toner cartridge CRG1 with a new toner cartridge CRG2, and restarts the execution of the print job J1. Then, the image processor 110 performs rasterization, color conversion, tone correction, and halftone processing on the uncorrected image data 131a read out from the memory 112 under control of the control unit 150. As a result, the image(s) of the third copy of the print job J1 is formed using the toner cartridge CRG2 based on the compressed image data of which tones have been corrected using the tone correction tables suitable for the image output characteristics related to the new toner cartridge CRG2. Consequently, the color appearance and density of the printed image(s) of the third copy of the print job J1 will not deteriorate compared to the color appearance and density of the printed images of the first and second copies.

Thereafter, when the first copy of the print job J2 being printed, uncorrected image data 131b is stored in the memory 112. In addition, compressed image data 135b generated by the compression unit 117 is stored in the memory 118. As far as no further replacement of a member or any other calibration trigger is detected, each copy of printed image(s) of the print job J2 is formed based on the compressed image data 135*b* using the toner cartridge CRG2.

By re-executing tone correction on uncorrected image data in this way and then restarting printing of the remaining uncompleted copies when a toner cartridge is replaced, it is possible to avoid an unnatural change in color appearance and density of printed images in the middle of job execution. In addition, by temporarily storing image data before rasterization as uncorrected image data and reusing it, the required amount of memory resources for temporary data storage can be reduced compared to the case of storing image data after rasterization and before tone correction. For example, the data size of color image data of a single page with four colors of C, M, Y and K, a bit depth of 8 bits, the size of A4 (210 mm by 297 mm) and a resolution of 600 dpi in a bitmap format is about 139 megabytes. In contrast, the data size of similar color image data before rasterization described by PDL is, in many cases, less than one megabyte though it depends on its image content. Therefore, it can be said that the required amount of memory resources may be suppressed on the order of one-hundredth in the case of temporarily storing image data before rasterization compared to the case of temporarily storing image data after rasterization and before tone correction. It should be noted that the data size of the compressed image data after halftone processing for similar image data is about 17 megabytes, which is significantly smaller even considered together with the size of about one megabyte of the uncorrected image data when compared to the data size of the image data after rasterization and before tone correction.

3. FLOW OF PROCESSING

Figure 8:
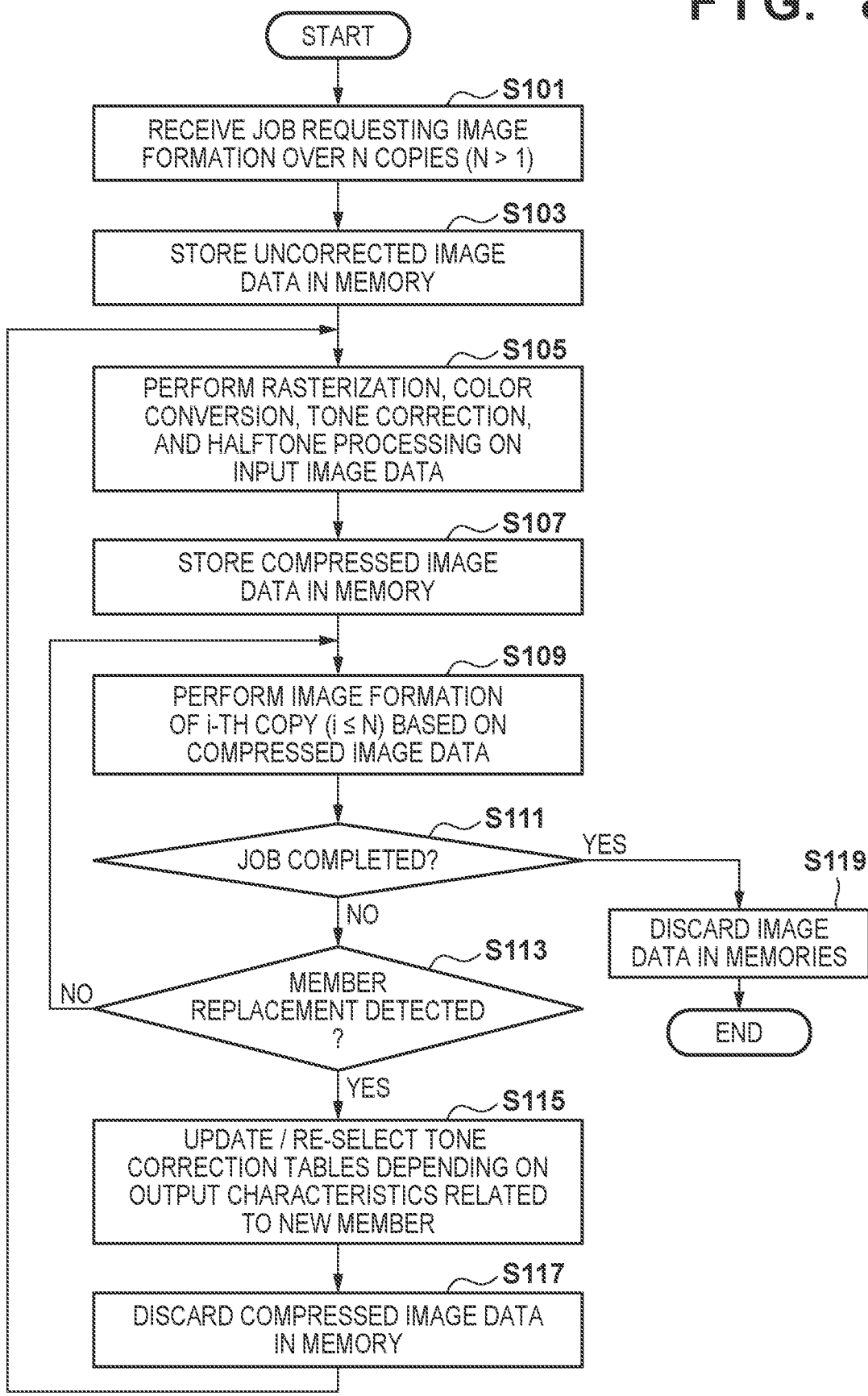
FIG. 8 is a flow chart illustrating an example of a flow of image processing according to a first practical example.
Figure 9:
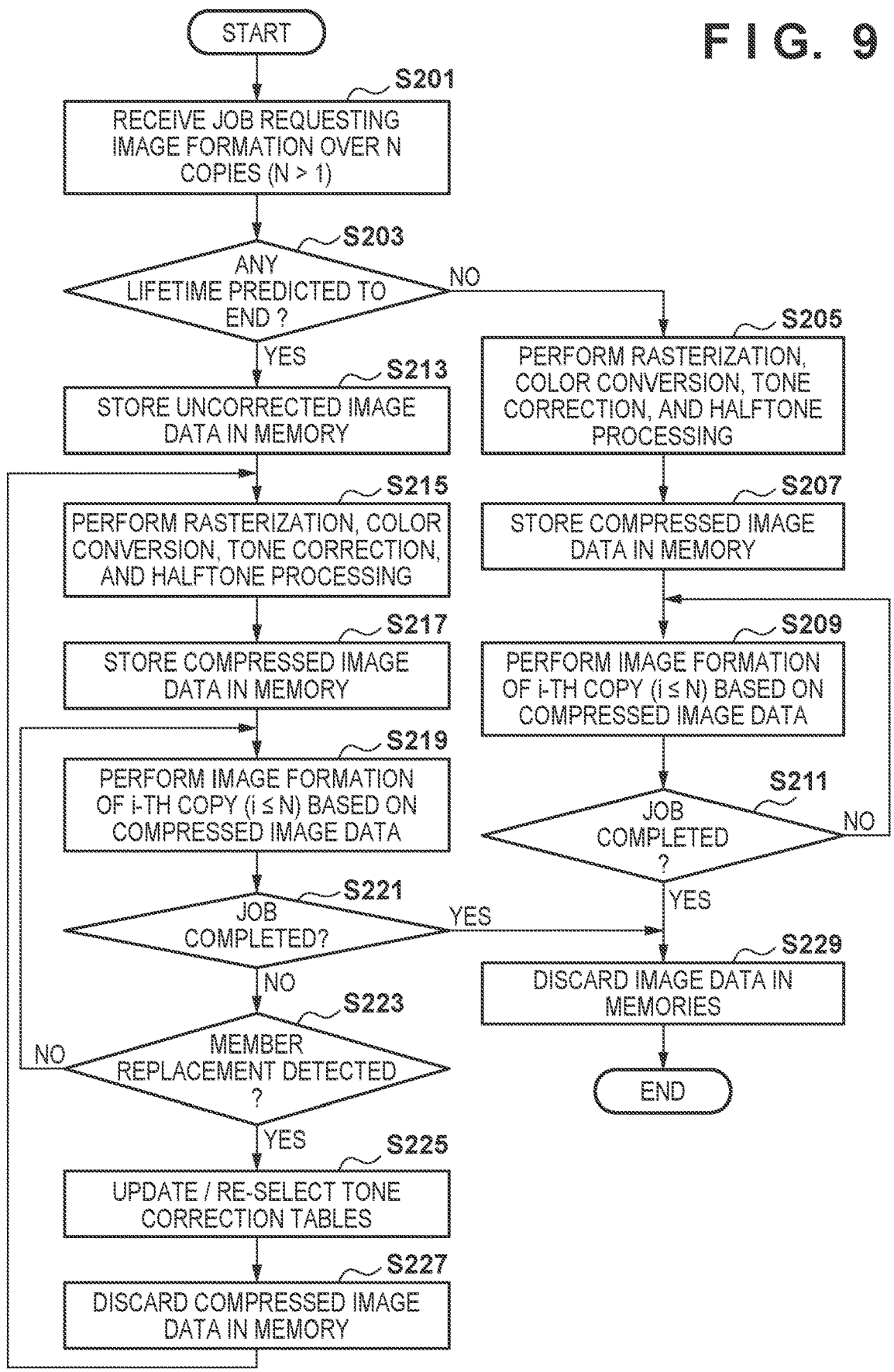
FIG. 9 is a flow chart illustrating an example of a flow of image processing according to a second practical example.

In this section, examples of flows of image processing that may be performed by the multifunction peripheral 100 according to the above-described embodiment are described using the flow charts of FIGS. 8 and 9. The processing illustrated in each flow chart may be performed by the image processor 110, the image forming unit 120 and the characteristics acquisition unit 130 under control of the control unit 150 executing computer programs stored in the storage unit 105. Note that, in the following description, a process step is abbreviated to 'S (step)'.

3-1. First Practical Example

FIG. 8 illustrates an example of a flow of image processing according to a first practical example.

First, at S101, the control unit 150 receives a job requesting image formation via the communication interface 101 from an external apparatus, for example. Herein, it is assumed that a job requesting image formation over N copies (N>1) is received. The control unit 150 passes input image data designated by the received job to the rasterization unit 111 of the image processor 110. In addition, at S103, the control unit 150 stores, as uncorrected image data, the image data identical with the input image data passed to the rasterization unit 111 in the memory 112.

Next, at S105, an image conversion process to generate converted image data in a format that is suitable for image formation by the image forming unit 120 is performed from the input image data. The process performed here may include rasterization by the rasterization unit 111, color conversion by the color conversion unit 113, tone correction by the tone correction unit 115 and compression by the compression unit 117. The tone correction by the tone correction unit 115 is performed using the tone correction tables stored in the table storage unit 114 in which results of the latest calibration are reflected. The compression by the compression unit 117 may include halftone processing.

Next, at S107, the control unit 150 stores the compressed image data generated as a result of the processing at S105 in the memory 118.

Next, at S109, the image forming unit 120 performs image formation of i-th copy (i≤N) based on the compressed image data generated at S105 or the compressed image data stored in the memory 118 at S107. Note that an initial value of the variable i is one, and i is incremented whenever S109 is repeated (i i+1).

Next, at S111, the control unit 150 determines whether execution of the received job has been completed or not. For example, the value of the variable i has reached the number of copies N to be printed, the control unit 150 may determine that the execution of the received job has been completed. If the execution of the job has not been completed, the process proceeds to S113. If the execution of the job has been completed, the process proceeds to S119.

If the execution of the job has not been completed, at S113, the control unit 150 determines whether a replacement of one or more replaceable members of the image forming unit 120 is detected or not. In a case where the replacement unit 120 is not detected, the process goes back to S109, and image formation is performed for the next copy by reusing the compressed image data stored in the memory 118.

In a case where the replacement of one or more replaceable members of the image forming unit 120 is detected at S113, the control unit 150 updates or re-selects the tone correction tables of the table storage unit 114 depending on the image output characteristics of the image forming unit 120 related to the new replaceable member at S115. At this point, the control unit 150 may cause the characteristics acquisition unit 130 to measure (that is, re-acquire) the image output characteristics of the image forming unit 120, and may update or re-select the tone correction tables depending on the image output characteristics acquired as a result of the measurement. For example, in a case where an old toner cartridge is replaced with a new toner cartridge, the tone correction table representing the signal conversion curve 16*b* may be re-selected with which corrected signal values can be suppressed compared to the signal conversion curve 16*a* which has been used till then and with which larger corrected signal values tend to be output. In addition, at S117, the control unit 150 discards the compressed image data stored in the memory 118.

Then, the process goes back to S105, and the process steps of S105 to S117 are repeated for the next copy. It should be noted that the compressed image data is stored again in the memory 118 at step S107 after detection of the member replacement and thereafter the compressed image data in the memory 118 may be reused again to form images unless a further replacement of a member occurs.

If it is determined at S111 that the execution of the job has been completed, at S119, the control unit 150 discards the uncorrected image data stored in the memory 112 and the compressed image data stored in the memory 118. Then, the image processing of FIG. 8 ends.

Noted that an example where one copy consists of only one page is described here for ease of explanation. However, one copy may include multiple pages and, in that case, the process steps at and after S103 may be iterated for each page. In addition, rasterization, color conversion, tone correction, and compression for different copies or different pages may be performed in parallel for productivity enhancement as far as the circuit configuration allows it. These points also apply to the second practical example described in the next section.

3-2. Second Practical Example

In the second practical example of the present embodiment, the control unit 150 of the multifunction peripheral 100 monitors lifetimes of the replaceable members of the image forming unit 120. For example, the control unit 150 may monitor, for each of the one or more replaceable members, the lifetime of the replaceable member by measuring the accumulated number of operations or operation time regarding image forming operations after the previous replacement. The number of operations regarding image forming operations may be measured by counting the number of sheets consumed by the executed jobs, for example. The control unit 150 may estimate a remaining lifetime of each replaceable member by subtracting the accumulated numbers of operation or operation time from a preset upper limit value. Then, in a case where it is predicted at the beginning of job execution that no replaceable member will reach its end of lifetime during execution of the job (that is, there remains sufficient lifetime), the control unit 150 may refrain from storing the uncorrected image data in the memory 112. In this case, the image formation of the second and subsequent copies in a job over multiple copies may be performed by reusing the compressed image data in the memory 118. Meanwhile, in a case where it is predicted that at least one replaceable member will reach its end of lifetime during job execution (that is, the remaining lifetime will reach zero), the control unit 150 stores the uncorrected image data in the memory 112. In this case, the image formation of the second and subsequent copies in a job over multiple copies may be performed by reusing the compressed image data in the memory 118 as far as no replacement of a replaceable member is detected, and the uncorrected image data in the memory 112 may be reused in response to a detection of the replacement.

FIG. 9 illustrates an example of a flow of image processing according to such a second practical example.

First, at S201, the control unit 150 receives a job requesting image formation via the communication interface 101 from an external apparatus, for example. Herein, it is assumed that a job requesting image formation over N copies (N>1) is received. The control unit 150 passes input image data designated by the received job to the rasterization unit 111 of the image processor 110.

At S203, the control unit 150 refers to a counter that counts the number of operations of each replaceable member, for example, to determine whether it is predicted that any lifetime will end during execution of the received job. For example, the control unit 150 can derive the number of sheets representing the remaining lifetime of a certain replaceable member by subtracting, from an upper limit value preset for that member, the number of sheets consumed after the member was mounted in the multifunction peripheral 100. In a case where this remaining lifetime is smaller than the number of sheets to be consumed (for example, the number of copies to be printed multiplied by the number of pages per a copy) in the received job, it may be predicted that the lifetime will end during the job execution. In a case where it is predicted at S203 that none of the lifetimes of the replaceable members will end during the job execution, the process proceeds to S205. Meanwhile, in a case where it is predicted that a lifetime of one or more replaceable members will end during the job execution, the process proceeds to S213.

At S205, an image conversion process to generate converted image data in a format that is suitable for image formation by the image forming unit 120 is performed from the input image data. The process performed here may include rasterization by the rasterization unit 111, color conversion by the color conversion unit 113, tone correction by the tone correction unit 115 and compression by the compression unit 117.

Next, at S207, the control unit 150 stores the compressed image data generated as a result of the processing at S205 in the memory 118.

Next, at S209, the image forming unit 120 performs image formation of i-th copy (i≤N) based on the compressed image data generated at S205 or the compressed image data stored in the memory 118 at S207. Note that an initial value of the variable i is one, and i is incremented whenever S209 is repeated (i i+1).

Next, at S211, the control unit 150 determines whether execution of the received job has been completed or not. For example, the value of the variable i has reached the number of copies N to be printed, the control unit 150 may determine that the execution of the received job has been completed. If the execution of the job has not been completed, the process goes back to S209, and image formation is performed for the next copy based on the compressed image data. If the execution of the job has been completed, the process proceeds to S229.

At S213, the control unit 150 stores, as uncorrected image data, the image data identical with the input image data passed to the rasterization unit 111 in the memory 112.

Next, at S215, an image conversion process to generate converted image data in a format that is suitable for image formation by the image forming unit 120 is performed from the input image data. The process performed here may include rasterization by the rasterization unit 111, color conversion by the color conversion unit 113, tone correction by the tone correction unit 115 and compression by the compression unit 117. The tone correction by the tone correction unit 115 is performed using the tone correction tables stored in the table storage unit 114 in which results of the latest calibration are reflected.

Next, at S217, the control unit 150 stores the compressed image data generated as a result of the processing at S215 in the memory 118.

Next, at S219, the image forming unit 120 performs image formation of i-th copy (i≤N) based on the compressed image data generated at S215 or the compressed image data stored in the memory 118 at S217. Note that i is incremented whenever S219 is repeated (i←i+1).

Next, at S221, the control unit 150 determines whether execution of the received job has been completed or not. If the execution of the job has not been completed, the process proceeds to S223. If the execution of the job has been completed, the process proceeds to S229.

If the execution of the job has not been completed, at S223, the control unit 150 determines whether a replacement of one or more replaceable members of the image forming unit 120 is detected or not. In a case where the replacement is not detected, the process goes back to S219, and image formation is performed for the next copy by reusing the compressed image data stored in the memory 118.

In a case where the replacement of one or more replaceable members of the image forming unit 120 is detected at S223, the control unit 150 updates or re-selects the tone correction tables of the table storage unit 114 depending on the image output characteristics of the image forming unit 120 related to the new replaceable member at S225. At this point, the control unit 150 may cause the characteristics acquisition unit 130 to measure (that is, re-acquire) the image output characteristics of the image forming unit 120, and may update or re-select the tone correction tables depending on the image output characteristics acquired as a result of the measurement. In addition, at S227, the control unit 150 discards the compressed image data stored in the memory 118.

Then, the process goes back to S215, and the process steps of S215 to S227 are repeated for the next copy. It should be noted that the compressed image data is stored again in the memory 118 at step S217 after detection of the member replacement and thereafter the compressed image data in the memory 118 may be reused again to form images unless a further replacement of a member occurs.

If it is determined at S211 or S221 that the execution of the job has been completed, at S229, the control unit 150 discards the image data stored in the memory 112 and the memory 118. Then, the image processing of FIG. 9 ends.

Refraining from storing the uncorrected image data in a memory when it is predicted that no member will reach its end of lifetime during job execution as in the second practical example allows for saving the usage of memory resources, mitigating load imposed on circuitry, and enhancing productivity of the image formation. When it is predicted that a member will reach its end of lifetime during the job execution, the uncorrected image data is stored in a memory in preparation for reuse. Then, when a replacement of a replaceable member occurs, processing such as tone correction is performed on the uncorrected image data stored in the memory so that images can be formed based on the image data suitable for the image output characteristics related to the member after the replacement. Therefore, it is possible to avoid an unnatural change in color appearance and density of printed images due to the member replacement in the middle of the job similarly to the first practical example. In addition, by temporarily storing and reusing image data before rasterization as the uncorrected image data, in the case of a lifetime of a member being predicted to end, it is possible to reduce the required amount of memory resources compared to the case of temporarily storing and reusing raster image data. A processing delay resulting from re-execution of the rasterization will occur only when a member is replaced.

4. SUMMARY

Various embodiments, practical examples and alterations of the technology according to the present disclosure have been described above with reference to FIGS. 5 to 9. According to the above-described embodiments, in a case where image formation over multiple copies is performed and when no replacement of a member involved in the image forming operation is detected, the compressed image data after tone correction and lossy compression is reused for image formation of the second and subsequent copies. This shortens execution time of a job over multiple copies and enhances productivity. Meanwhile, when a replacement of a member involved in the image forming operation is detected, the uncorrected image data on which the tone correction has not been performed is reused, and image formation of the second and subsequent copies is performed subsequently to at least the tone correction and the lossy compression. This prevents an unnatural change in color appearance and density due to the member replacement. In this way, both of suppression of variation in color appearance and density of printed images and enhancement of productivity can be achieved according to the above-described embodiments.

In the above-described embodiments, the uncorrected image data reused when the member replacement is detected is image data prior to being processed by a raster image processor. In this case, it is possible to avoid increase in manufacturing cost of the apparatus and increase in load imposed on circuitry because the temporary storage of the image data for the reuse does not require huge memory resources.

In the above-described embodiments, when no member replacement is detected, the compressed image data generated by lossy compression including halftone processing is reused for image formation. In this case, as the temporarily-stored compressed image data has a bit depth reduced to one bit for each color component, it is possible to significantly save the usage of memory resources.

5. OTHER EMBODIMENTS

The following embodiments may also be covered by the scope of the present disclosure:

Embodiment 1

An image forming apparatus comprising:

a correction unit configured to perform tone correction for image data to generate corrected image data;

a compression unit configured to compress the corrected image data to generate compressed image data;

an image forming unit configured to form, on a sheet, an image based on the compressed image data using one or more replaceable members;

a storage unit that is capable of storing uncorrected image data for which the tone correction has not been performed and the compressed image data;

a characteristics acquisition unit configured to acquire output characteristics of the image forming unit, the output characteristics being related to the one or more replaceable members; and a control unit configured to control operation of the image forming unit;

wherein the characteristics acquisition unit is configured to acquire the output characteristics of the image forming unit when a replacement of the one or more replaceable members is detected, wherein the correction unit is configured to perform the tone correction based on the output characteristics acquired by the characteristics acquisition unit, and wherein, in a case where image formation over multiple copies is performed, the control unit is configured to:

control the image forming unit to form images by reusing the compressed image data stored in the storage unit when a replacement of the one or more replaceable members is not detected, and control the image forming unit to form images by reusing the uncorrected image data stored in the storage unit when a replacement of the one or more replaceable members is detected.

Embodiment 2

The image forming apparatus according to embodiment 1, wherein the uncorrected image data is image data prior to being processed by a raster image processor.

Embodiment 3

The image forming apparatus according to embodiment 1, wherein the compression by the compression unit includes halftone processing.

Embodiment 4

The image forming apparatus according to embodiment 1, wherein the correction unit is configured to perform the tone correction by referring to a tone correction table that depends on the output characteristics of the image forming unit, and
wherein the tone correction table is calibrated depending on the output characteristics acquired by the characteristics acquisition unit when a replacement of the one or more replaceable members is detected.

Embodiment 5

The image forming apparatus according to embodiment 1, wherein the control unit is configured to monitor lifetime of the one or more replaceable members, and to refrain from storing the uncorrected image data in the storage unit in a case where it is predicted that the lifetime of the one or more replaceable members will not end during execution of a job.

Embodiment 6

The image forming apparatus according to embodiment 1, wherein the one or more replaceable members of the image forming unit include at least one of:
a photosensitive member;
a charging roller configured to charge the photosensitive member;
a light source configured to expose the charged photosensitive member to light to form an electrostatic latent image on the photosensitive member;
a developing roller configured to supply developer agent to the electrostatic latent image to form a developer agent image on the photosensitive member; and
a transfer device configured to transfer the developer agent image formed on the photosensitive member to the sheet.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-132064, filed on Aug. 13, 2021, which is hereby incorporated by reference herein in its entirety.

What is claimed is:

1. An image forming apparatus comprising:
an image processor configured to convert image data based on a conversion condition;
an image forming unit configured to form an image based on the image data converted by the image processor as converted image data, the image forming unit having a replaceable member;
a memory configured to store the image data and the converted image data;
a sensor configured to perform measurement of a test image formed by the image forming unit; and
a controller configured to:
detect a replacement of the replaceable member;
in a case where the replacement of the replaceable member is detected while the image forming apparatus is forming images based on a job, control the image forming unit to form the test image;
generate the conversion condition based on a result of the measurement of the test image performed by the sensor; and
in a case where the replacement of the replaceable member is detected while the image forming apparatus is forming the images based on the job, control the image processor to convert the image data stored in the memory based on the generated conversion condition.

2. The image forming apparatus according to claim 1, wherein the controller controls, in a case where the replacement of the replaceable member is detected while the image forming apparatus is forming the images based on the job, the image forming unit to form the test image without forming any remaining images from the converted image data stored before the replacement was detected.

3. The image forming apparatus according to claim 1, wherein the image processor converts the image data by at least rasterizing the image data, and
wherein the converted image data is raster image data.

4. The image forming apparatus according to claim 1, wherein the image processor converts the image data by at least performing halftone processing on the image data.

5. The image forming apparatus according to claim 1, wherein the conversion condition includes at least one tone correction table.

6. The image forming apparatus according to claim 1, wherein the replaceable member is a photosensitive member.

7. The image forming apparatus according to claim 1,
wherein the image forming unit includes a photosensitive member, a charging roller that charges the photosensitive member, a light source that exposes the photosensitive member charged by the charging roller to form an electrostatic latent image, and a developing roller that develops the electrostatic latent image by using toner, and
wherein the replaceable member is the charging roller.

8. The image forming apparatus according to claim 1,
wherein the image forming unit includes a photosensitive member, a charging roller that charges the photosensitive member, a light source that exposes the photosensitive member charged by the charging roller to form an electrostatic latent image, and a developing roller that develops the electrostatic latent image by using toner, and
wherein the replaceable member is the developing roller.

* * * * *